United States Patent
Kwak et al.

(10) Patent No.: US 9,032,717 B2
(45) Date of Patent: May 19, 2015

(54) ACTIVE DIESEL PARTICULATE FILTER REGENERATION SYSTEM USING NON-WORK LOAD AND METHOD THEREOF

(75) Inventors: Kyu Sun Kwak, Incheon (KR); Wan Ho Kim, Incheon (KR); Suk Won Lee, Gyeonggi-do (KR)

(73) Assignee: Doosan Infracore Co., Ltd., Incheon (KR)

( * ) Notice: Subject to any disclaimer, the term of this patent is extended or adjusted under 35 U.S.C. 154(b) by 0 days.

(21) Appl. No.: 13/996,658

(22) PCT Filed: Dec. 21, 2011

(86) PCT No.: PCT/KR2011/009912
§ 371 (c)(1),
(2), (4) Date: Jun. 21, 2013

(87) PCT Pub. No.: WO2012/087015
PCT Pub. Date: Jun. 28, 2012

(65) Prior Publication Data
US 2013/0269320 A1 Oct. 17, 2013

(30) Foreign Application Priority Data

Dec. 22, 2010 (KR) .................. 10-2010-0132932
Dec. 22, 2010 (KR) .................. 10-2010-0132934

(51) Int. Cl.
*F01N 3/00* (2006.01)
*F01N 9/00* (2006.01)
(Continued)

(52) U.S. Cl.
CPC .............. *F01N 9/002* (2013.01); *F01N 3/0253* (2013.01); *F01N 3/035* (2013.01); *F01N 3/106* (2013.01);
(Continued)

(58) Field of Classification Search
CPC ....... F01N 9/002; F01N 3/0253; F01N 3/035; F01N 3/106; F01N 3/021; F01N 2013/026; F01N 13/02; F01N 2550/02; F02D 41/029
USPC ............ 60/274, 295, 311, 284, 286, 297, 300
See application file for complete search history.

(56) References Cited

U.S. PATENT DOCUMENTS 8,127,536 B2 * 3/2012 Hosaka ........................... 60/295
8,230,679 B2 * 7/2012 Frazier et al. .................. 60/295
(Continued)

FOREIGN PATENT DOCUMENTS

CN 101302952 A 11/2008
CN 101466935 A 6/2009
(Continued)

OTHER PUBLICATIONS

Yoneda et al., Filter Clogging Warning Method and Filter Clogging Elimination Method, Oct. 2005, Translation.*
(Continued)

*Primary Examiner* — Thomas Denion
*Assistant Examiner* — Kelsey Stanek
(74) *Attorney, Agent, or Firm* — John D. Veldhuis-Kroeze; Westman, Champlin & Koehler, P.A.

(57) ABSTRACT

The present disclosure relates to an active diesel particulate filter (DPF) regeneration system of an engine, and more particularly, to an active DPF regeneration system and method, in which a non-work load is arbitrarily provided to the engine to quickly perform an active DPF regeneration even in a state where substantial work of a construction machine is stopped.

1 Claim, 7 Drawing Sheets (51) Int. Cl.
  *F01N 3/025* (2006.01)
  *F01N 3/035* (2006.01)
  *F01N 3/10* (2006.01)
  *B60W 10/30* (2006.01)
  *F02D 41/02* (2006.01)

(52) U.S. Cl.
  CPC ............ *F02D 41/021* (2013.01); *F02D 41/029* (2013.01); *F02D 2041/026* (2013.01); *Y02T 10/47* (2013.01); *B60W 10/30* (2013.01); *B60Y 2300/476* (2013.01)

(56) References Cited

U.S. PATENT DOCUMENTS

| | | | |
|---|---|---|---|
| 2009/0165446 A1* | 7/2009 | Haseyama et al. | 60/286 |
| 2010/0024391 A1 | 2/2010 | Frazier et al. | |

FOREIGN PATENT DOCUMENTS

| | | |
|---|---|---|
| JP | 07-166840 A | 6/1995 |
| JP | 10-246108 A | 9/1998 |
| JP | 2003-120259 A | 4/2003 |
| JP | 2005299436 A * | 10/2005 |
| JP | 4469207 B2 | 3/2010 |
| WO | 2010104075 A1 | 9/2010 |

OTHER PUBLICATIONS

Search Report dated Jul. 20, 2012 and written in Korean with English translation attached for International Patent Application No. PCT/KR2011/009912 filed Dec. 21, 2011, 5 pages.

Chinese Office Action dated Jan. 4, 2015 for corresponding Chinese Application No. 201180062333.1, 6 pages.

\* cited by examiner

ACTIVE DIESEL PARTICULATE FILTER REGENERATION SYSTEM USING NON-WORK LOAD AND METHOD THEREOF

CROSS-REFERENCE TO RELATED APPLICATION

This application is a Section 371 National Stage application of International Application No. PCT/KR2011/009912, filed Dec. 21, 2011 and published, not in English, as WO2012/087015 on Jun. 28, 2012.

FIELD OF THE DISCLOSURE

The present disclosure relates to an active diesel particulate filter (DPF) regeneration system of an engine, and more particularly, to an active DPF regeneration system and method, in which a non-work load is arbitrarily provided to the engine to quickly perform an active DPF regeneration even in a state where substantial work of a construction machine is stopped.

BACKGROUND OF THE DISCLOSURE

An engine used in a construction machine is required to meet various regulations and standards. One of the standards is to decrease contaminants, such as nitrogen oxide (NOx) and a particulate matter (PM) contained in exhaust gas, which may serve as a significant environment standard, together with regulations on a noise, in using the construction machine.

In order to comply with the environment standard, an engine adopting various means, such as an exhaust gas recirculation (EGR) apparatus and a diesel particulate filter (DPF) apparatus, has been typically used.

Here, the DPF refers to a filter capable of collecting and filtering soot that is a particulate matter including exhaust fumes on a path, for example, within a muffler, through which exhaust gas discharged from the engine is discharged, and may also refer to a device on which the aforementioned filter is mounted. Hereinafter, the diesel particulate filter will be abbreviated as the DPF.

The filter requires a process of removing soot collected therein periodically or arbitrarily according to the amount of collected soot, which is typically referred to as a "DPF regeneration" or a "combustion and removal".

The regeneration may be generally divided into a passive regeneration and an active regeneration according to an implementation method thereof.

For example, a passive DPF regeneration refers to a method in which soot collected inside a filter is combusted by an increased temperature of exhaust gas while operating a construction machine, or a small amount of fuel is injected into a path through which exhaust gas is discharged during an operation of a construction machine, so that a diesel oxidation catalyst (DOC) apparatus disposed on the path in advance and the injected fuel generate an exothermic reaction to generate higher heat, thereby combusting collected soot.

Next, an active DPF regeneration refers to a method in which exhaust gas is discharged by actively driving an engine of a construction machine without requiring substantial work to be performed by a driver, and a small amount of fuel injected into an exhaust path based on a temperature of the exhaust gas also generates an exothermic reaction with a DOC apparatus disposed on the exhaust path in advance, so that a temperature of the exhaust gas is further increased to a temperature necessary for combustion (regeneration) of soot, thereby combusting the soot collected inside a filter.

A schematic configuration of a typical active DPF regeneration system will be described with reference to FIG. 1 below.

Figure 1:
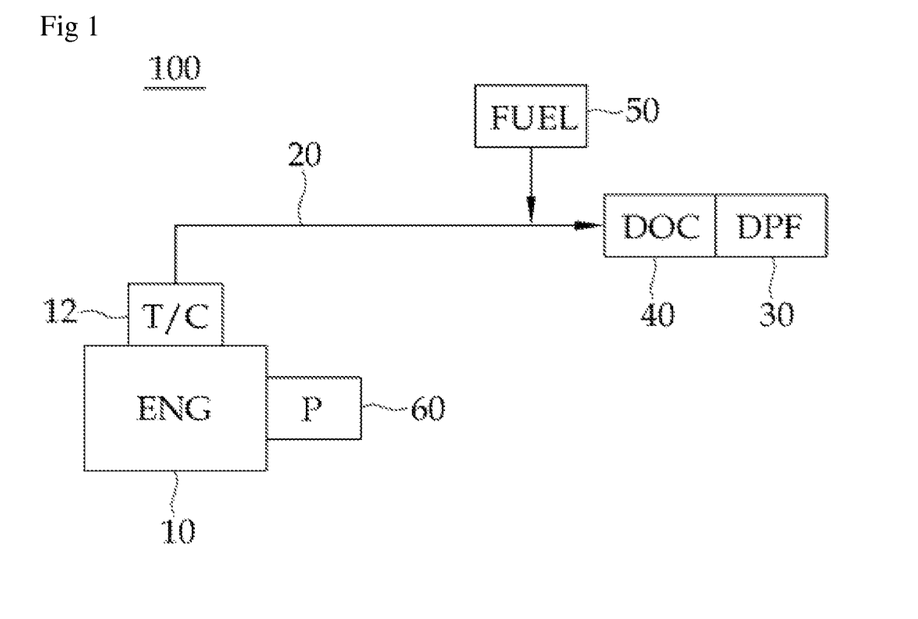
FIG. 1 is a block diagram illustrating an example of an active DPF regeneration system in the related art.

Referring to FIG. 1, the typical active DPF regeneration system 100 includes an engine 10 provided with a turbo charger 12, a DPF 30 provided on an exhaust path 20 through which exhaust gas discharged from the engine is discharged, and a DOC apparatus 40 at a front end of the DPF, and further includes a fuel injection means 50 for injecting a small amount of fuel into a front end of the DOC in the exhaust path 20, and a pump 60 driven by the engine 10.

In a case of the active DPF regeneration, substantial work load is not generated, so that details thereof will be omitted in the drawing.

In a case of the active DPF regeneration with the system having the aforementioned configuration, since a construction machine is in an operation stopped state, the active DPF regeneration maintains a state where substantial work of the construction machine, such as driving a front work means, such as a boom and a bucket, and driving a vehicle in front and rear directions, is not generated, and an engine is driven in an idle state (that is, low rpm) receiving a minimum load, and thus a temperature of exhaust gas discharged in the idle state is not easily increased.

That is, the exhaust gas discharged from the engine, which beings to be driven in the idle state, has a relatively low temperature, compared to a temperature while being operated.

In the meantime, in order to combust (DPF regenerate) soot collected inside the DPF by the active DPF regeneration method, an exothermic reaction needs to be generated between the DOC disposed on the exhaust path and fuel injected into the exhaust path at the front end of the DOC, and the exothermic reaction is available at a predetermined temperature (approximately 235° C.) or higher, so that in a case of the active DPF regeneration performed without substantial work load, a considerable time is required until the exhaust gas is heated to the predetermined temperature.

The engine generally discharges exhaust gas with a higher temperature in a case where the engine is driven by receiving a load, compared to a case where the engine is driven in an idle driving state. However, since the engine is driven in a substantial no-load state (idle state) in a state where the construction machine is stopped in the active regeneration contrary to the passive regeneration, a considerable time is demanded until the temperature of the exhaust gas is increased to a predetermined temperature at which an exothermic reaction of the DOC is available. For example, it is known that in a case of the active DPF regeneration of the construction machine, approximately 30 minutes to one hour is taken.

Since purchase cost of the construction machine is large, most of the construction machines are generally rented based on hours or days, and contrary to the passive DPF regeneration process, which is capable of being carried out with work, the active DPF regeneration process, which needs to spend a predetermined amount of time without performing an operation, this adds to a cost burden in renting the construction machine.

In addition, even in a case where the construction machine is not rented, a temporal stop of work for a considerable time due to the active DPF regeneration results in deterioration of general efficiency of the work process of the construction machine.

Further, since the engine needs to be continuously driven during the active DPF regeneration process continued for the long time, there is difficulty in which the amount of fuel consumption increases in proportion to a continuous time of the performance of the active DPF regeneration.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

The present disclosure provides an active DPF regeneration system and method capable of being efficiently performed by quickly increasing a temperature of the exhaust gas by arbitrarily providing non-work load to an engine.

Further, the present disclosure provides an active DPF regeneration system and method capable of minimizing the amount of fuel consumed in relation to an active regeneration by quickly performing an active DPF regeneration.

In order to achieve the above object, the present disclosure provides an active diesel particulate filter regeneration system using a non-work load, including: an engine; pumps serially connected to the engine to discharge a working fluid, and configured to be capable of varying a discharge flow of the working fluid; a diesel particulate filter (DPF) disposed on an exhaust path through which exhaust gas discharged from the engine is discharged to the outside; a fuel injection means configured to perform an active DPF regeneration of combusting and removing soot collected in the diesel particulate filter by injecting fuel into the exhaust path at a predetermined temperature; a selection switch configured to select the active DPF regeneration; and an active load generating means configured to provide a non-work load to the engine by increasing a discharge flow of the pump when the active DPF regeneration is selected.

As described above, in a case of the active DPF regeneration, the engine is driven by receiving the non-work load, so that it is possible to increase a temperature of exhaust gas to a predetermined temperature or higher within a shorter time, compared to a case where the engine is driven in the idle state, thereby facilitating an exothermic reaction of the DOC and a fuel and thus efficiently performing the DPF regeneration (combustion and removal) by the high temperature generated by the exothermic reaction.

Further, the system of the present disclosure is characterized in that the main pump discharges a maximum flow of working fluid by arbitrarily adjusting a fed back value to a minimum level during the active DPF regeneration when the main pump is driven by a negative control system of feeding back a signal value based on pressure of the working fluid collected in the tank through a center by-pass line and controlling a discharge flow of the working fluid.

Further, the system of the present disclosure is characterized in that a solenoid valve disposed on a path through which the fed back value is transferred is further provided, and a minimum fed back value is generated by blocking the solenoid valve.

Further, the system of the present disclosure is characterized in that the main pump discharges a maximum flow of working fluid by arbitrarily adjusting a proportion current value to a maximum level during the active DPF regeneration when the main pump is driven by a positive control system of controlling the discharge flow of the working fluid based on the proportion current value transferred to the main pump through a proportion control valve connected to a joystick within an operation seat.

Further, the present disclosure provides a method of actively regenerating a DPF in the active DPF regeneration system using a non-work load, including: (a) driving an engine in an idle state; (b) measuring a temperature of exhaust gas at a front end of the DOC; (c) when the measured temperature is equal to or lower than the predetermined temperature, providing a non-work load to the engine by driving the active load generating means; (d) discharging exhaust gas with a higher temperature by the non-work load by the engine; (e) when the measured temperature is higher than the predetermined temperature, and the active load generating means is currently driven, stopping a driving of the active load generating means; (f) performing an active DPF generation; and (g) repeating steps (b) to (f) until the DPF regeneration is completed, in which the active DPF regeneration is efficiently performed by facilitating an exothermic reaction between the DOC and a fuel by the high-temperature exhaust gas.

Further, as another example for achieving the above object, in an exemplary embodiment of the present disclosure, the present disclosure provides an active diesel particulate filter regeneration system using a non-work load, including: an engine, a DPF disposed on an exhaust path through which exhaust gas discharged from the engine is discharged to the outside; a DOC device disposed at a front end of the DPF on the exhaust path; a fuel injection means configured to inject a fuel generating an exothermic reaction with the DOC at a predetermined temperature to a front end of the DOC on the exhaust path; and an active load generating means configured to provide a non-work load to the engine, in which an active load regeneration means is configured by a fan pump, and the fan pump is controlled so as to arbitrarily discharge a maximum flow of working fluid without causing substantial work of the construction machine during the active DPF regeneration, so that the non-work load is generated and thus the engine discharges the exhaust gas at the predetermined temperature or higher.

As described above, in a case of the active DPF regeneration, the engine is driven by receiving the non-work load, so that it is possible to increase a temperature of exhaust gas to a predetermined temperature or higher within a shorter time, compared to a case where the engine is driven in the idle state, thereby facilitating an exothermic reaction of the DOC and a fuel and thus efficiently performing the DPF regeneration (combustion and removal) by the high temperature generated by the exothermic reaction.

Further, the system of the present disclosure is characterized in that the fan pump discharges a maximum flow of working fluid by using a variable fan pump as the fan pump and arbitrarily adjusting a proportion current signal transferred to the variable fan pump to a maximum level during the active DPF regeneration.

Further, the system of the present disclosure is characterized in that the fan pump is connected with at least one separately driven fan motor which is not serially connected with the engine.

The present disclosure provides a method of actively regenerating a DPF the an active DPF regeneration system using a non-work load, including: (a) driving an engine in an idle state; (b) measuring a temperature of exhaust gas on an exhaust path; (c) when the measured temperature is equal to or lower than the predetermined temperature, providing a non-work load to the engine by driving the active load generating means; (d) discharging exhaust gas with a higher temperature by the non-work load by the engine; (e) when the measured temperature is higher than the predetermined temperature, and the active load generating means is currently driven, stopping a driving of the active load generating means; (f) performing an active DPF generation; and (g) repeating steps (b) to (f) until the DPF regeneration is completed, and in this case, the active DPF regeneration is efficiently performed by facilitating an exothermic reaction by the high-temperature exhaust gas.

According to the present disclosure, there are provided the active DPF regeneration system and method capable of being efficiently performed by quickly increasing a temperature of exhaust gas by arbitrarily providing a non-work load, not a substantial work load, of a construction machine to an engine when the active DPF regeneration is performed.

Further, according to the present disclosure, there are provided the active DPF regeneration system and method capable of minimizing the amount of fuel consumed in relation to an active regeneration by quickly performing an active DPF regeneration.

DESCRIPTION OF MAIN REFERENCE NUMERALS OF DRAWINGS 100, 200, 300, 400, 400a: Active DPF regeneration system
10, 110, 210: Engine (ENG)
12, 112, 212: Turbo charger (T/C)
20, 120, 212: Exhaust path
30, 130, 230: Diesel particulate filter (DPF)
40, 140, 240: Diesel oxidation catalyst (DOC) device
50, 150, 250: Fuel injection means
60, 160, 260: Pump (main pump)
160a: Fan pump
162, 262: Center by-pass line
164, 264: Tank
170, 270: Working unit control valve
180, 182, 182a: Fed-back signal
190, 192, 192a: Solenoid valve
280, 460: First and second proportion control valves
282, 462: First and second proportion control signals
470: Oil cooler
472, 482: Fan motor
474, 484: Cooling fan
480: Radiator
S: Control signal

DETAILED DESCRIPTION

Hereinafter, an exemplary embodiment of the present disclosure will be described with reference to the drawings.

Figure 2:
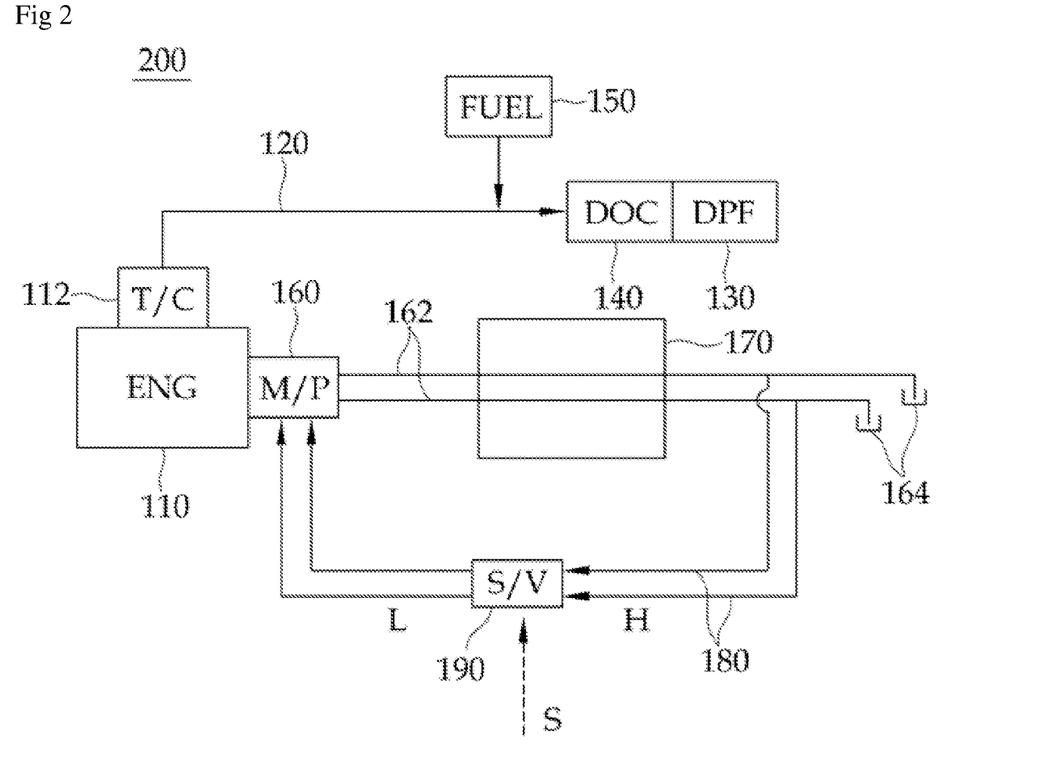
FIG. 2 is a block diagram illustrating an active DPF regeneration system according to an exemplary embodiment of the present disclosure.

FIG. 2 is a block diagram illustrating an active DPF regeneration system according to an exemplary embodiment of the present disclosure.

Particularly, the active DPF regeneration system 200 of the present exemplary embodiment includes an engine 110 provided with a turbo charger 112, a diesel oxidation catalyst (DOC) device 140 and a diesel particulate filter (DPF) 130 which are sequentially disposed on an exhaust path 120 of exhaust gas discharged from the engine 110, and a fuel injection means 150 for injecting fuel to a front end of the DOC 140 on the exhaust path. Further, the active DPF regeneration system 200 of the present exemplary embodiment may further include a selection switch (not illustrated) for selecting an active DPF regeneration by a driver or a non-illustrated controller.

Further, the engine 110 is connected with a main pump 160 for supplying working fluid to various working units (for example, a boom, a bucket, and a swing motor) of the construction machine, and the main pump 160 supplies the working fluid through a hydraulic circuit including a center by-pass line 162 and a parallel line to cause driving of each working unit by controlling a working unit control valve 170.

In the drawings, the working unit control valve 170 is simply illustrated as one block, but actually means a plurality of control valves corresponding to each working unit (a boom, a bucket, and a swing motor), and ports and flow paths related to the plurality of control valves.

Further, a tank 164 for collecting the working fluid is provided at a distal end of the center by-pass line 162, and a signal value 180 based on pressure of the working fluid immediately before the collection of the tank 164 is fed back to the main pump 160, and a flow of discharged working fluid of the main pump 160 may be controlled based on the fed-back signal value in real time thereafter.

Further, a solenoid valve 190 is formed during a feedback course of the signal value 180, and a signal S controlling the solenoid valve 190 is provided. The control signal S transfers, for example, a value for blocking the solenoid valve 190 during the active DPF regeneration.

As described above, FIG. 2 illustrates an example of the active DPF regeneration system 200 capable of being applied to a case where the main pump 160 is driven by, namely, a negative control system.

The negative control system means, for example, a method of feeding back the signal value 180 based on pressure of the working fluid collected to the tank 164 through the center by-pass line 162 and controlling the working fluid discharge flow of the main pump 160 in real time.

The negative control system is characterized in determining a discharge flow in inverse proportion to the fed-back signal value (or also referred to as a "negative control signal"). For example, according to the negative control system, as the signal value fed back to the main pump is decreased, the discharge flow is increased (L→H), and as the signal value is high, the discharge flow is decreased (H→L).

In a case where the construction machine performs substantial work, since the working fluid is supplied to each working unit (the boom, the bucket, and the swing motor— not illustrated), pressure of the working fluid collected in the tank 164 positioned at a distal end of the center by-pass line 162 is decreased, and a signal value L based on a value of the low pressure is fed back, so that the main pump 160 discharges a high working fluid flow H in inverse proportion to the fed-back signal value L.

For example, in a case where the construction machine complexly drives the boom and the bucket, the main pump 160 may discharge the working fluid with a higher flow.

Contrary to this, when the construction machine does not perform substantial work, pressure of the working fluid collected in the tank 164 positioned at a distal end of the center by-pass line 162 is increased, and a signal value H based on a value of the high pressure is fed back, so that the main pump 160 discharges a low working fluid flow L in inverse proportion to the fed-back signal value H.

That is, in a case of no substantial work, the main pump 160 may discharge only a minimum flow. Eventually, a substantial load is not provided to the engine, and the engine is driven in an idle state.

In the aforementioned system 200, in a case where the driver performs the active DPF regeneration by operating the selection switch (not illustrated), the substantial work load is not generated, so that the engine 110 is driven at the idle state (that is, low rpm).

As described above, in order to more quickly perform the active DPF regeneration, an increase in a temperature of the exhaust gas discharged from the engine 110 to a predetermined temperature (for example, approximately 235° C.) or higher, which is a reference for generating an exothermic reaction between the DOC 140 and the fuel, is demanded, and thus the present disclosure may quickly increase the temperature of the exhaust gas by providing non-work load, not substantial work, to the engine 110.

In the exemplary embodiment of the present disclosure, the term "non-work load" eventually means an arbitrary active load provided to the engine 110 without actually driving each working unit of the construction machine.

That is, in the exemplary embodiment, it is possible to arbitrarily control the negative control signal fed back to the main pump 160 to a minimum level by simply blocking the solenoid valve 190 disposed on the feedback path of the negative control signal, so that the main pump continuously discharges a maximum flow of working fluid even actual work is not performed.

As described above, while the main pump 160 discharges the maximum flow of working fluid, the "non-work load", which is the arbitrary active load, is supplied to the engine 110 according to the discharge of the working fluid, and the engine 110 is driven through the provision of the "non-work load", thereby more quickly increasing a temperature of the exhaust gas compared to a temperature of the exhaust gas in the idle state.

When the exhaust gas reaches the predetermined temperature, that is, approximately 235° C., an exothermic reaction between the DOC 140 and the fuel is facilitated by the temperature of the exhaust gas, and soot collected inside the DPF 130 positioned at a rear end of the DOC 140 may be combusted and removed by a high temperature of approximately 600° C. to 700° C. exhibited by the exothermic reaction. That is, the DPF regeneration may be performed.

As described above, the exemplary embodiment is characterized in that the signal value (negative control signal) 180 fed back to the main pump 160 driven by the negative control method is arbitrarily controlled to the minimum level by blocking the solenoid valve 190 disposed on the path, so that the main pump 160 discharges the maximum flow of the working fluid, thereby providing the "non-work load" to the engine 110.

Accordingly, it is characterized that the exhaust gas having a high temperature, preferably, the predetermined temperature for facilitating the exothermic reaction of the DOC 140, is more quickly discharged compared to a case where the engine 110 is driven in the idle state through a load in the related art.

Figure 3:
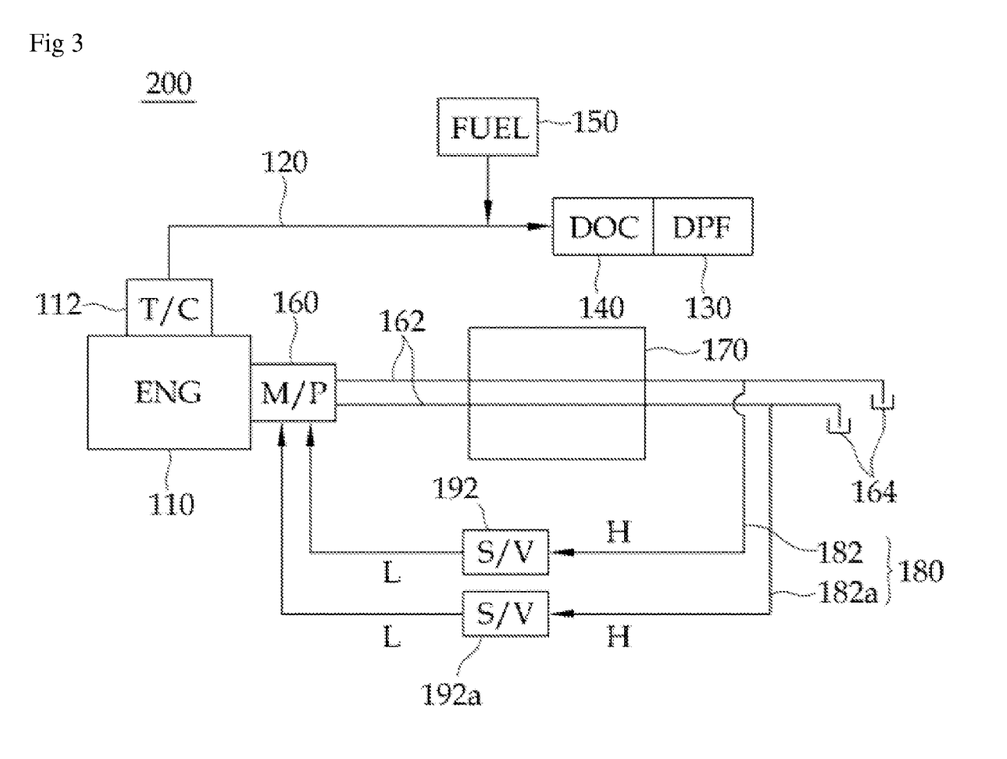
FIG. 3 is a block diagram illustrating an active DPF regeneration system according to another exemplary embodiment of the present disclosure.

Next, FIG. 3 illustrates a similar exemplary embodiment to that of the FIG. 2, but is different from FIG. 2 in that two solenoid valves 192 and 192a are disposed on a path through which the negative control signal is fed back.

Particularly, the main pump 160 is displayed as one block in the drawing, but a typical construction machine has a pair of left and right main pumps, and the main pump 160 of FIGS. 2 and 3 may actually mean two main pumps, that is, a pair of left and right main pumps.

Further, the hydraulic circuits, such as the center by-pass line, the parallel line, the working unit control valve, and the tank, are separately provided based on each main pump, and as a result, the signal value (negative control signal) based on pressure of the working fluid collected in the tank also needs to be fed back to each main pump, and thus the two solenoid valves 192 and 192a are provided on paths, through which signal values 182 and 182a are fed back, respectively.

That is, a configuration of FIG. 3 is substantially the same as that of FIG. 2, except that the respective solenoid valves 192 and 192a are provided on the paths through which the signal values are fed back to the main pump, respectively, and may be understood as a modified example of the exemplary embodiment of FIG. 2.

Figure 4:
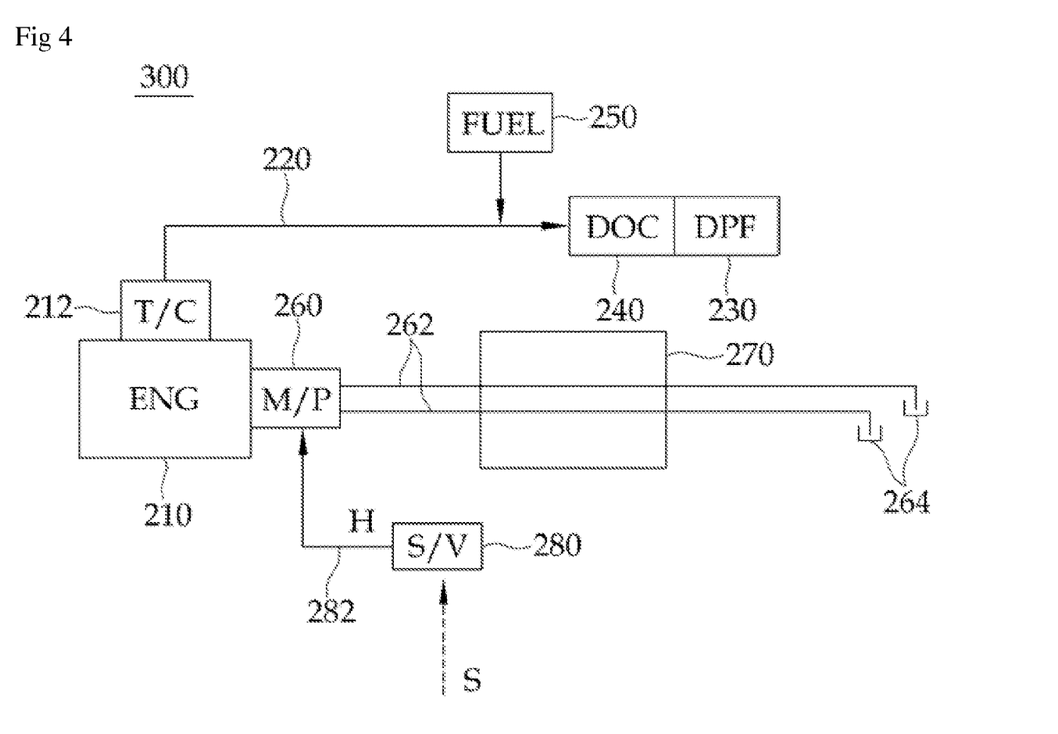
FIG. 4 is a block diagram illustrating an active DPF regeneration system according to yet another exemplary embodiment of the present disclosure.

Next, FIG. 4 is a block diagram illustrating an active DPF regeneration system according to another exemplary embodiment of the present disclosure.

Particularly, the active DPF regeneration system 300 of the present exemplary embodiment includes an engine 210 provided with a turbo charger 212, a diesel oxidation catalyst (DOC) device 240 and a diesel particulate filter (DPF) 230 which are sequentially disposed on an exhaust path 220 of exhaust gas discharged from the engine 210, and a fuel injection means 250 for injecting fuel to a front end of the DOC 240 on the exhaust path.

Further, the engine 210 is connected with a main pump 260 for supplying working fluid to various working units (for example, a boom, a bucket, and a swing motor—not illustrated) of the construction machine, and the main pump 260 supplies the working fluid through a predetermined hydraulic circuit including a center by-pass line 262 and a parallel line to allow driving of each working unit by controlling a working unit control valve 270.

In the drawings, the working unit control valve 270 is simply illustrated as one block, but actually means a plurality of control valves corresponding to each working unit (a boom, a bucket, and a swing motor), and ports and flow paths related to the plurality of control valves.

Further, a tank 264 for collecting the working fluid is provided at a distal end of the center by-pass line 262.

Further, a first proportion control valve 280 controlled in response to, for example, an operation of a joystick is disposed inside an operation seat. The first proportion control valve 280 controls a flow of the working fluid supplied from a non-illustrated working fluid supply source to the main pump 260 and utilizes the flow as the first proportion control signal 282. The first proportion control signal 282 is transferred to a pump regulator (not illustrated) determining a flow of the main pump 260, and then a working fluid discharge flow of the main pump 160 may be controlled in real time. Here, in a case where the main pump 260 is provided in a form of an electronic pump, the first proportion control valve 280 may be replaced with a controller, and the controller may be configured to control the discharge flow of the main pump 260 in response to an operation of the joystick of a driver.

A signal S controlling the proportion control valve may be provided to the first proportion control valve 280 apart from the operation of the joystick. The control signal S may control, for example, the first proportion control valve 280 during the active DPF regeneration.

As described above, FIG. 4 illustrates an example of an active DPF regeneration system 300 capable of being applied to a case where the main pump 260 is driven by, namely, a positive control system.

The positive control system refers to a method of controlling the working fluid discharge flow of the main pump 260 according to the first proportion control signal 282 transferred from the first proportion control valve 280 in response to, for example, the operation of the joystick inside the operation seat in real time, and is characterized in determining the discharge flow in proportion to the transferred proportion control signal (or also referred to as a "positive control signal").

For example, according to the positive control system, as the signal value transferred to the main pump is low, the discharge flow is decreased (L→L), and as the signal value is high, the discharge flow is increased (H→H).

In a case where an actual construction machine performs substantial work, the joystick inside the operation seat is operated in order to drive each working unit (the boom, the bucket, the swing motor, and the like—not illustrated), and the first proportion control signal 282 of the first proportion control valve 280 is transferred to the main pump 260 in response to the operation of the joystick, so that the main pump 260 discharges a high working fluid flow H in proportion to the first proportion control signal 282.

For example, in a case where the construction machine complexly drives the boom and the bucket, the main pump 260 may discharge the working fluid with a higher flow.

Contrary to this, when the construction machine does not perform substantial work, the joystick is not operated, and thus a lowest proportion control signal is transferred to the main pump 260, and the main pump 260 discharges a minimum working fluid flow L in proportion to the proportion control signal.

That is, in a case of no substantial work, the main pump 260 may discharge only a minimum flow. Eventually, a substantial load is not provided to the engine, and the engine is driven in an idle state.

In the aforementioned system 300, in a case where the active DPF regeneration is performed, the substantial work load is not generated, so that the engine 110 is driven at the idle state (that is, low rpm).

As described above, in order to more quickly perform the active DPF regeneration, an increase in a temperature of the exhaust gas discharged from the engine 210 to a predetermined temperature (for example, approximately 235° C.) or higher, which is a reference for generating an exothermic reaction between the DOC 240 and the fuel, is demanded, and thus the present disclosure may quickly increase the temperature of the exhaust gas by providing a non-work load, not substantial work, to the engine 210.

That is, in the exemplary embodiment, it is possible to arbitrarily control the first proportion control signal 282 transferred from the first proportion control valve 280 to a maximum level by simply providing a control signal S to the first proportion control valve 280, and thus the main pump continuously discharges a maximum flow of working fluid even though substantial work is not performed.

As described above, while the main pump 260 discharges the maximum flow of working fluid, the "non-work load", which is the arbitrary active load, is supplied to the engine 210 according to the discharge of the working fluid, and the engine 210 is driven through the provision of the "non-work load", thereby more quickly increasing a temperature of the exhaust gas compared to the temperature in the idle state.

When the exhaust gas reaches the predetermined temperature, that is, approximately 235° C., an exothermic reaction between the DOC 240 and the fuel is facilitated by the temperature of the exhaust gas, and soot collected inside the DPF 230 positioned at a rear end of the DOC 240 may be combusted and removed by a high temperature of approximately 600° C. to 700° C. exhibited by the exothermic reaction. That is, the DPF regeneration may be performed.

As described above, the present exemplary embodiment is characterized in that the first proportion control signal 282 of the first proportion control valve 280 transferred to the main pump 260 driven by the positive control system is arbitrarily controlled to a maximum level, so that the main pump 260 discharges the maximum flow of working fluid to provide the "non-work load" to the engine 210, and thus the exhaust gas having a high temperature, preferably, the predetermined temperature for facilitating the exothermic reaction of the DOC 140, is more quickly discharged compared to a case where the engine 210 is driven in the idle state through a load in the related art.

Hereinafter, another exemplary embodiment of the present disclosure will be described in detail with reference to the drawing.

Figure 5:
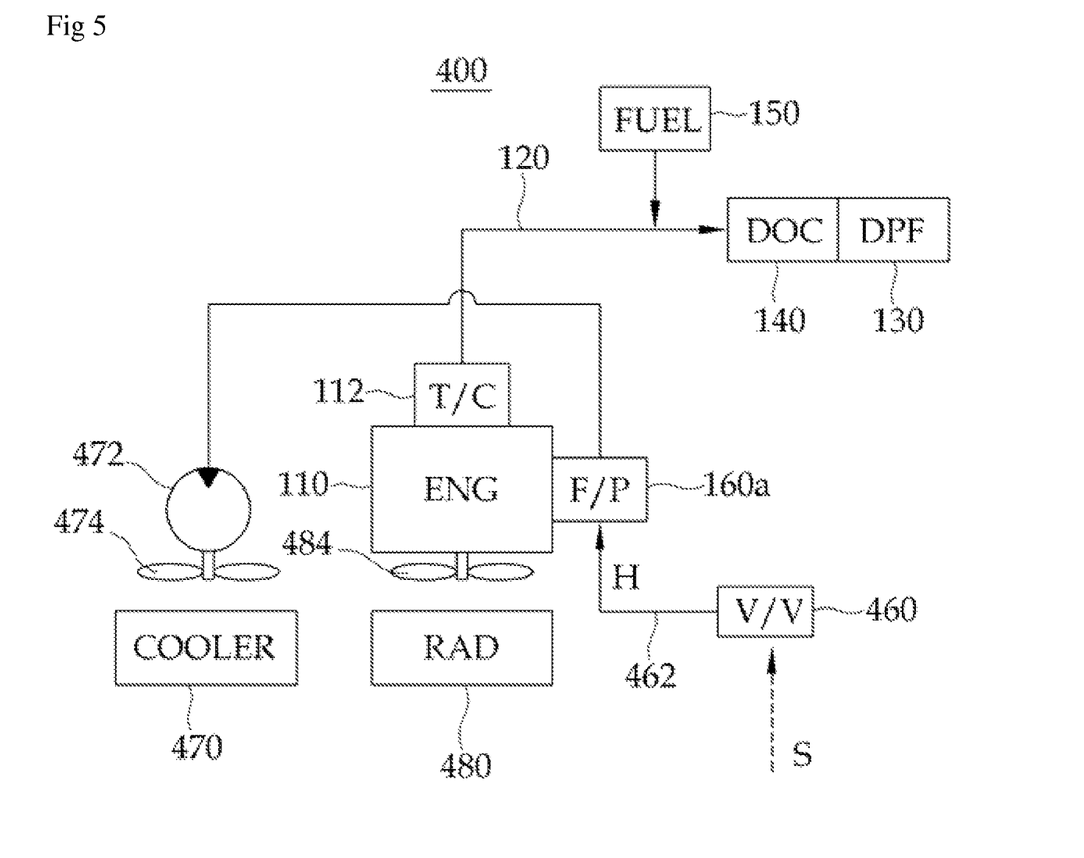
FIG. 5 is a block diagram illustrating an active DPF regeneration system according to an exemplary embodiment of the present disclosure.

FIG. 5 is a block diagram illustrating an active DPF regeneration system according to another exemplary embodiment of the present disclosure.

Particularly, an active DPF regeneration system 400 of the present exemplary embodiment includes an engine 110 provided with the turbo charger 112, a diesel oxidation catalyst (DOC) device 140 and a diesel particulate filter (DPF) 130 which are sequentially disposed on the exhaust path 120 of exhaust gas discharged from the engine 110, and a fuel injection means 150 for injecting fuel to the front end of the DOC 140 on the exhaust path.

Further, the engine 110 is connected with, for example, a fan pump (F/P) 160 for supplying working fluid to a fan motor 472 for rotationally driving a cooling fan 474, together with a main pump (not illustrated) for supplying working fluid to various working units (for example, the boom, the bucket, and the swing motor) of the construction machine.

The fan pump 160a may be a variable fan pump capable of varying a flow by changing a swash plate by a control of a pump regulator (not illustrated), and may be controlled through a second proportion control signal 462 transferred through a control means, such as a second proportion control valve 460.

In another exemplary embodiment, the cooling fan 472 applied to an oil cooler 470 may be rotated by the fan motor 472 driven by receiving the working oil from the fan pump 160a.

Further, the cooling pan 484 applied to a radiator 480 does not include a separate fan motor and the like, but may be serially connected with the engine 110 to be rotated.

In another exemplary embodiment, it is illustrated that the oil cooler 470 is connected through the fan pump 160a and the radiator 480 is serially connected with the engine 110, but it should be noted that the elements are not limited thereto and may be configured in various forms.

A hydraulic driving part including the main pump, each working unit (the boom, the bucket, and the swing motor) driven through the main pump, and the plurality of control valves corresponding to the respective working units is omitted in the drawing, and since the working units are not substantially driven during the active DPF regeneration, a detailed description thereof will be omitted below.

In the aforementioned system 400, in a case where the active DPF regeneration is performed by operating the selection switch (not illustrated) for selecting the active regeneration by the driver or the controller, the substantial work load is not generated, so that the engine 110 is driven in the idle state (that is, low rpm).

As described above, in order to more quickly perform the active DPF regeneration, an increase in a temperature of the exhaust gas discharged from the engine 110 to a predetermined temperature (for example, approximately 235° C.) or higher, which is a reference for generating an exothermic reaction between the DOC 140 and the fuel, is demanded, and thus the present disclosure may quickly increase the temperature of the exhaust gas by providing the non-work load, not substantial work, to the engine 110.

In another exemplary embodiment of the present disclosure, the term "non-work load" eventually means an arbitrary active load provided to the engine 110 without actually driving each working unit of the construction machine.

That is, in another exemplary embodiment, the fan pump 160a, which is not connected with each working unit, may be controlled to discharge a maximum flow of working fluid, that is, it is possible to arbitrarily control the second proportion control signal 462 transferred from the control signal S to a maximum level by providing the control signal S to the second proportion control valve 460 controlling the fan pump 160a, and thus the fan pump continuously discharges the maximum flow of working fluid regardless of substantial work.

As described above, while the fan pump 160a discharges the maximum flow of working fluid, the "non-work load", which is an arbitrary and active load, is provided to the engine 110, and the engine 110 is driven through the provision of the "non-work load", thereby more quickly increasing a temperature of the exhaust gas compared to a temperature of the exhaust gas in the idle state.

When the exhaust gas reaches the predetermined temperature, that is, approximately 235° C., an exothermic reaction between the DOC 140 and the fuel is facilitated by the temperature of the exhaust gas, and soot collected inside the DPF 130 positioned at a rear end of the DOC 140 may be combusted and removed at a high temperature of approximately 600° C. to 700° C. exhibited by the exothermic reaction. That is, the DPF regeneration may be performed.

As described above, another exemplary embodiment is characterized that the proportion control signal transferred to the fan pump rotating the plurality of cooling fans separately driven regardless of the respective working units (for example, the boom, the bucket, and the swing motor) is arbitrarily controlled to a maximum level, so that the fan pump 160a discharges the maximum flow of working fluid to provide the "non-work load" to the engine 110, and thus the exhaust gas having a high temperature, preferably, the predetermined temperature for facilitating the exothermic reaction of the DOC 140, is more quickly discharged compared to a case where the engine 110 is driven in the idle state through a load in the related art.

Figure 6:
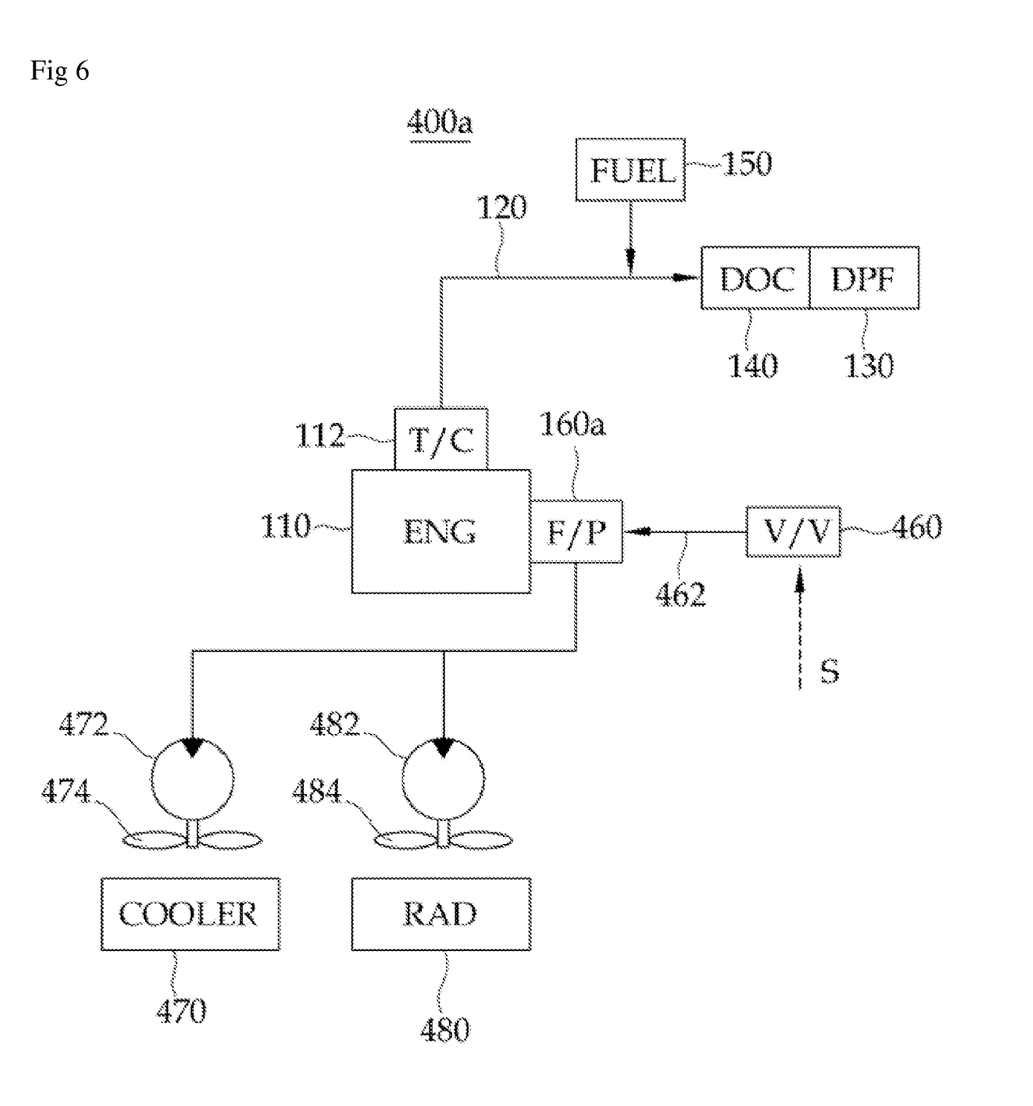
FIG. 6 is a block diagram illustrating an active DPF regeneration system according to another exemplary embodiment of the present disclosure.

Next, FIG. 6 illustrates a similar exemplary embodiment to that of FIG. 5, but the exemplary embodiment of FIG. 6 is simply different from that of FIG. 5 in that both the oil cooler 470 and the radiator 480 are rotatably disposed by separately driven fan motors 472 and 482.

That is, the exemplary embodiment of FIG. 6 is different from that of FIG. 5 in that in the system 400 of FIG. 5, the radiator 480 employs the cooling fan serially connected with the engine, but in a system 400' of FIG. 6, the radiator 480 is operated by using the separate fan motor 482 driven by receiving the working fluid by the fan pump 160a similar to the oil cooler 470.

That is, except for all of the cooling fans 474 and 484 illustrated in FIG. 6 are configured to be rotated by the fan motors 472 and 482 driven by the fan pump 160a, the configuration of FIG. 6 is substantially the same as that of FIG. 5, so that the exemplary embodiment of FIG. 6 may be understood as a modified example of the exemplary embodiment of FIG. 5.

Further, in the aforementioned exemplary embodiment, only the two fan motors 472 and 482 driven by the fan pump 160a are exemplified for the oil cooler 470 and the radiator 480, respectively, but it is obvious that the fan motors are not limited thereto.

Further, the fan pump 160a may be configured to, for example, supply the working fluid demanded while operating the joystick inside the operation seat, or supply the working fluid used in a steering device, a braking device, and the like of the construction machine.

However, the generation of the substantial work of the construction machine during the process of the active DPF regeneration is not demanded, and thus the present disclosure may be applied within a range in which the fan pump 160a may discharge the maximum flow of working fluid without performing the substantial work (the driving of the boom, the bucket, and the like, or the steering or the braking of the construction machine).

For example, in order to cool heat generated in an engine room while performing the active DPF regeneration, a separate cooling fan may be disposed, and the cooling fan may also be driven through the fan motor connected with the fan pump 160a of the present disclosure.

Figure 7:
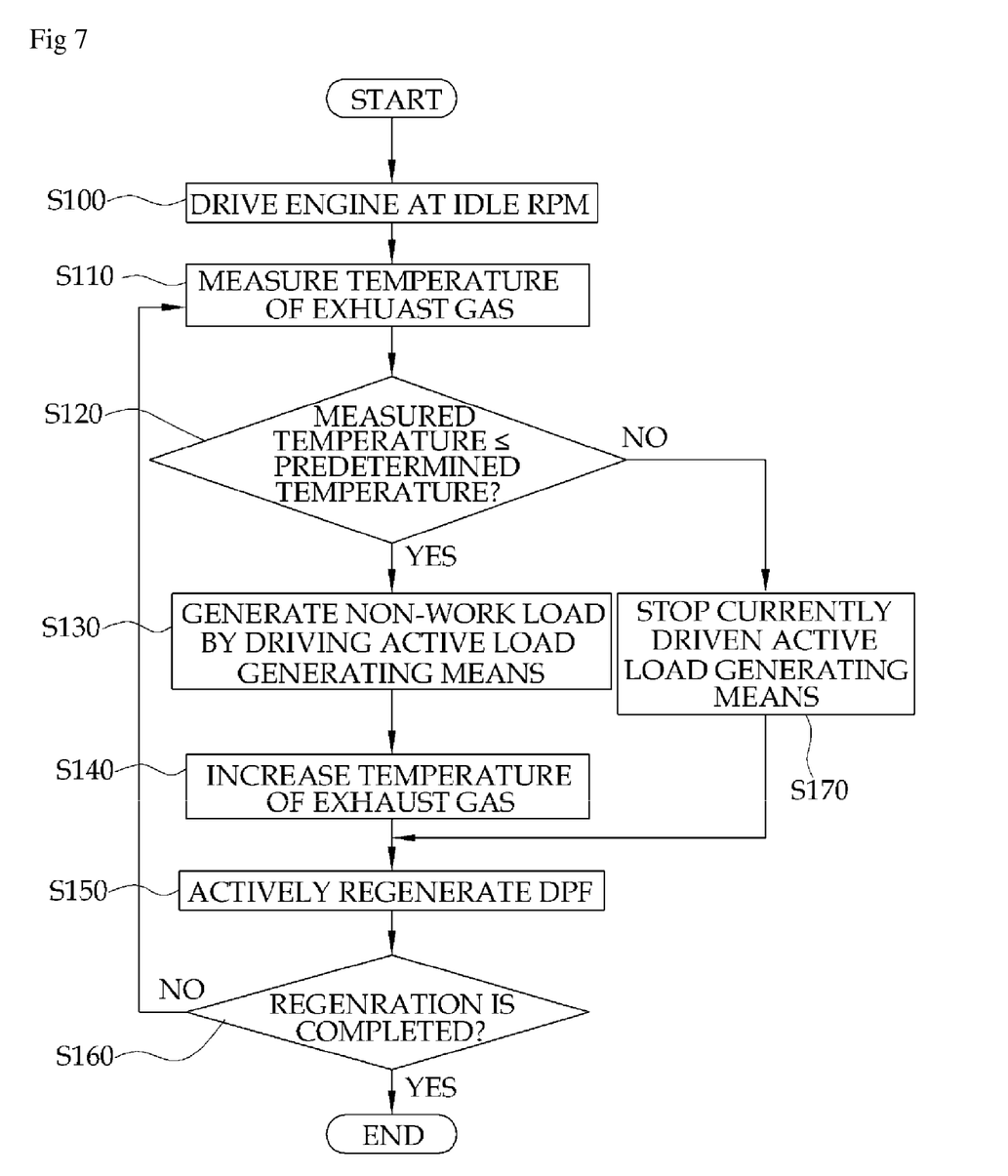
FIG. 7 is a flowchart illustrating an active DPF regeneration method according to yet another exemplary embodiment of the present disclosure.

Next, FIG. 7 is a flowchart illustrating an active DPF regeneration method according to the exemplary embodiment and another exemplary embodiment of the present disclosure.

Referring to FIG. 7, in the present exemplary embodiment, in order to perform the active DPF regeneration, the engine is driven in the idle state for a start (S100). In order to perform the DPF regeneration, a high temperature, for example, 600° C. to 700° C., capable of combusting and removing (regenerating) soot (particulate including exhaust fumes) collected in the DPF is demanded, and may be achieved by an exothermic reaction between the DOC and the injected fuel during the active DPF regeneration.

Accordingly, when the temperature of the exhaust gas reaches a predetermined temperature, that is, approximately 235° C., capable of facilitating the exothermic reaction of the DOC, the active DPF regeneration may be performed.

Accordingly, the temperature of the exhaust gas is measured at the front end of the DOC on the exhaust path (S110).

The measured temperature is compared with the predetermined temperature (approximately 235° C.) capable of facilitating the exothermic reaction (S120).

As a result of the comparison, when the measured temperature is equal to or lower than the predetermined temperature, a non-work load is generated by driving an active load generating means formed of the fan pump as described above, and the generated non-work load is provided to the engine (S130).

The engine is driven by receiving the non-work load, so that the temperature of the exhaust gas may be more quickly increased without a substantial work load, such as the driving of the boom, the bucket, and the like, compared to the idle state (S140).

When the temperature of the exhaust gas is increased to the predetermined temperature capable of facilitating the exothermic reaction of the DOC, a higher temperature (approximately 600° C. to 700° C.) than the predetermined temperature (approximately 235° C.) is generated by the exothermic reaction between the DOC and the fuel, and thus soot collected in the DPF is combusted and removed (regenerated) through the high temperature (S150).

Then, whether the regeneration is completed is identified (S160), and the active DPF regeneration method is terminated.

In addition, when it is determined that the measured temperature is higher than the predetermined temperature in the aforementioned measured temperature comparison step S120, after confirming whether the active load generating means is driven, and when the active load generating means is driven, the generation of the non-work load is stopped by stopping the currently driven active load generating means (S170).

That is, the engine is allowed to be driven in the idle state by removing the non-work load affecting the engine, thereby preventing the fuel from being unnecessarily consumed.

For example, in view of the fact that the provision of the non-work load to the engine is for the purpose of increasing the temperature of the exhaust gas to the predetermined temperature capable of facilitating the exothermic reaction of the DOC, it is not necessary to apply the "non-work load" to the engine any longer after checking a state where the purpose is achieved.

It is a matter of course that it is possible to determine whether to provide the non-work load in real time, and decrease the amount of unnecessary fuel consumption according to the determination by repeating the step of continuously measuring the temperature of the exhaust gas at the front end of the DOC and the subsequent steps (S110 to S160) until the regeneration is completed.

As described above, the present disclosure provides a non-work load, not a substantial work load, of the construction machine to the engine so as to more quickly increase a temperature of the exhaust gas to a predetermined temperature when performing the active DPF regeneration, compared to a case where the engine is driven in the idle state in the related, so that it is possible to decrease a time taken for the active DPF regeneration, and simultaneously promote a decrease in the amount of fuel consumption according to the decrease in the time.

Further, the provision of the non-work load is blocked in a case where the temperature of the exhaust gas is higher than a predetermined temperature by selectively providing the non-work load according to the temperature of the exhaust gas, thereby resulting in promoting a decrease in the amount of fuel consumption.

The hydraulic system of the construction machine according to the present disclosure may be used for temporarily driving the construction machine when an operation of an electronic control unit for controlling an electronic hydraulic pump is abnormal, especially, when the control of the electronic control unit fails because the amount of operation of a joystick input in the electronic control unit fails to be normally transferred.

Although the present disclosure has been described with reference to exemplary and preferred embodiments, workers skilled in the art will recognize that changes may be made in form and detail without departing from the spirit and scope of the disclosure.

The invention claimed is:

1. An active diesel particulate filter regeneration system using a non-work load, comprising:
   an engine;
   a pump serially connected to the engine to discharge a working fluid, and configured to be capable of varying a discharge flow of the working fluid;
   a diesel particulate filter (DPF) disposed on an exhaust path through which exhaust gas discharged from the engine is discharged to the outside;
   a fuel injection means configured to perform an active DPF regeneration of combusting and removing soot collected in the diesel particulate filter by injecting a fuel into the exhaust path at a predetermined temperature;
   a selection switch configured to select the active DPF regeneration; and
   an active load generating means configured to provide a non-work load to the engine by increasing a discharge flow of the pump when the active DPF regeneration is selected;
   wherein the pump includes a main pump serially connected to the engine to supply the working fluid for driving a working unit, and when the main pump is driven by a negative control system controlling the discharge flow of the working fluid by feeding back a signal value based on pressure of the working fluid collected in a tank through a center by-pass line, the active load generating means enables the main pump to discharge a maximum flow of working fluid by arbitrarily adjusting the fed back value to a minimum level during the active DPF regeneration, and
   wherein the fed-back signal value is generated by applying the working fluid collected in the tank to a pump regulator of the main pump, the active load generating means further includes a solenoid valve disposed on the path through which the fed-back signal value is transferred, and the minimum fed back value is generated by blocking the solenoid valve.

* * * * *